(12) United States Patent
Bieker (10) Patent No.: US 7,520,411 B2
(45) Date of Patent: Apr. 21, 2009

(54) PORTABLE FLUID-TRANSPORTING SYSTEM

(76) Inventor: Stephen P. Bieker, 12915 SE Ridgecrest Dr., Portland, OR (US) 97236

( * ) Notice: Subject to any disclaimer, the term of this patent is extended or adjusted under 35 U.S.C. 154(b) by 681 days.

(21) Appl. No.: 11/077,626

(22) Filed: Mar. 10, 2005

(65) Prior Publication Data

US 2005/0155993 A1    Jul. 21, 2005

Related U.S. Application Data (63) Continuation of application No. 10/631,447, filed on Jul. 30, 2003, now Pat. No. 6,889,877, which is a continuation-in-part of application No. 10/052,859, filed on Jan. 17, 2002, now Pat. No. 6,851,588.

(60) Provisional application No. 60/448,330, filed on Feb. 18, 2003, provisional application No. 60/399,941, filed on Jul. 30, 2002.

(51) Int. Cl.
*B60P 3/22* (2006.01)
*A62C 27/00* (2006.01)
*A62C 3/06* (2006.01)
*B60D 1/00* (2006.01)
*B60G 17/04* (2006.01)

(52) U.S. Cl. ............. 222/609; 169/24; 169/66; 280/400; 280/124.159

(58) Field of Classification Search .......... 222/608, 222/609; 169/24, 66; 280/400, 124.159
See application file for complete search history.

(56) References Cited

U.S. PATENT DOCUMENTS

| | | |
|---|---|---|
| 689,001 A | 12/1901 | Hill |
| 882,098 A | 3/1908 | Chial |
| 1,128,856 A | 2/1915 | Cornwall et al. |
| 1,506,652 A | 8/1924 | Maker |
| 3,263,865 A | 8/1966 | Kachnik |
| 3,393,835 A | 7/1968 | Kantor et al. |
| D224,588 S | 8/1972 | Bauer |
| 3,797,743 A | 3/1974 | Kommers et al. |
| 3,989,404 A * | 11/1976 | Burton ................. 404/128 |
| 4,022,331 A * | 5/1977 | Bean et al. ............. 414/555 |
| 4,089,446 A | 5/1978 | Logan, II et al. |
| 4,149,734 A | 4/1979 | Sylvester |
| 4,159,059 A | 6/1979 | Christenson et al. |

(Continued)

OTHER PUBLICATIONS

Bobcat, product literature entitled "Attachment for Loaders" (8 pages) (undated).

(Continued)

*Primary Examiner*—Kevin P Shaver
*Assistant Examiner*—Melvin A Cartagena
(74) *Attorney, Agent, or Firm*—Klarquist Sparkman, LLP (57) ABSTRACT

The present invention concerns embodiments of a portable fluid-transporting system for mounting on a land-driven vehicle, such as a loader, and methods for their use. In an illustrated embodiment, a fluid-transporting device includes at least one fluid container, or tank, that is mountable to and completely removable from a vehicle. The container is configured to be carried by the vehicle such that at least a portion of the container is supported in front of the forward end of the vehicle. In particular embodiments, the container is generally U-shaped and includes a forward-container portion and first and second side-container portions extending from respective ends of the forward-container portion.

5 Claims, 6 Drawing Sheets

U.S. PATENT DOCUMENTS

| | | | |
|---|---|---|---|
| 4,162,796 A * | 7/1979 | Mead | 280/830 |
| 4,265,587 A | 5/1981 | Clark | |
| 4,351,535 A | 9/1982 | Mead | |
| D294,032 S | 2/1988 | Whiffin | |
| 4,723,710 A | 2/1988 | Lucore, II | |
| 4,917,193 A * | 4/1990 | Ockler | 169/24 |
| D314,389 S | 2/1991 | Lynnes et al. | |
| D317,926 S | 7/1991 | Lynnes et al. | |
| 5,098,019 A | 3/1992 | Landefeld | |
| 5,113,946 A | 5/1992 | Cooper | |
| 5,199,196 A | 4/1993 | Straley | |
| 5,318,314 A | 6/1994 | Cyphers et al. | |
| D359,497 S | 6/1995 | Rayner | |
| 5,476,146 A | 12/1995 | Brown | |
| 5,480,191 A | 1/1996 | Litin et al. | |
| 5,564,886 A | 10/1996 | Emerson et al. | |
| 5,667,113 A | 9/1997 | Clarke et al. | |
| 5,897,038 A | 4/1999 | Myers | |
| 6,145,711 A | 11/2000 | Prosper et al. | |
| 6,161,600 A | 12/2000 | Borkes | |
| 6,206,252 B1 | 3/2001 | Broadus | |
| 6,340,177 B1 | 1/2002 | Granderson et al. | |
| 6,499,934 B1 | 12/2002 | Kaczmarski et al. | |
| 6,595,392 B2 | 7/2003 | Barnett | |
| 6,598,914 B1 | 7/2003 | Dixon | |
| D500,055 S | 12/2004 | Bieker | |

OTHER PUBLICATIONS

Drawings of water tank shaped to fit within the hopper of a Bobcat skid-steer loader, pp. 1-3, publicly used prior to Jan. 17, 2001.

Sales bulletin, "Tanker Top Skid-Steer Water Tank," 2 pages (May 2002).

Dynaset website, "High Pressure Street Washing Units," http://www.dynaset.com/sites/KPL-ENG.html, 3 pages (publication date unknown).

For sale ad of a 1984 International S-1900 water truck by Worldwide Rental Services, 1 page (2004).

Cattail website, "Skidsteer & Track Loader Towbar System," http://www.cattailinfo.com/, 3 pages (publication date unknown).

Cattail website, "Skidsteer & Track Loader Towbar System," http://www.cattailinfo.com/gallery.html, 14 pages (publication date unknown).

Office action from the United States Patent & Trademark Office in U.S. Appl. No. 10/052,859, dated Sep. 17, 2003.

Office action from the United States Patent & Trademark Office in U.S. Appl. No. 10/052,859, dated Jan. 5, 2004.

Office action from the United States Patent & Trademark Office in U.S. Appl. No. 10/052,859, dated Jul. 7, 2004.

Notice of Allowance from the United States Patent & Trademark Office in U.S. Appl. No. 10/052,859, dated Sep. 29, 2004.

Notice of Allowance from the United States Patent & Trademark Office in U.S. Appl. No. 29/187,365, dated Aug. 5, 2004.

Office action from the United States Patent & Trademark Office in U.S. Appl. No. 10/631,447, dated May 19, 2004.

Notice of Allowance from the United States Patent & Trademark Office in U.S. Appl. No. 10/631,447, dated Dec. 17, 2004.

* cited by examiner

PORTABLE FLUID-TRANSPORTING SYSTEM

CROSS-REFERENCE TO RELATED APPLICATIONS

The present application is a continuation of U.S. Provisional Application 10/631,447, filed Jul. 30, 2003, U.S. Pat. No. 6,889,877 which claims the benefit of U.S. Provisional Application No. 60/399,941 filed February 18, 2003, and U.S. Provisional Application No.60/399,941 filed Jul. 30, 2002.The present application is also a continuation-in-part of U.S. Application No. 10/052,859 filed Jan. 17 , 2002, now U.S. Pat. No. 6,851,588, Application Ser. Nos. 60/448,330, 60/399,941 , 10/052,859 are incorporated herein by reference.

FIELD

The present invention concerns embodiments of a portable fluid-transporting system for mounting on a land-driven vehicle, such as a loader.

BACKGROUND

Water tank trucks are used in various aspects of construction, such as for storing, conveying, or distributing water. In a specific example, such trucks are commonly used for spraying water on a dirt surface to minimize dust creation. The high cost of water tank trucks, however, can be prohibitive, especially for small-scale contractors. Most contractors, however, typically have in their possession some type of vehicle for hauling construction materials, such as a dump truck, a pick-up truck, or a skid-steer loader. Accordingly, as an alternative to conventional water tank trucks, apparatuses have been devised for enabling the load compartment of a vehicle, typically used for hauling solid materials, to convey and distribute water.

One such apparatus is shown U.S. Pat. No. 3,393,835 to Kantor et al. This patent discloses a flexible container that is shaped to complement the interior space of the load compartment of a dump truck. As another example, U.S. Pat. No. 5,098,019 to Landefeld discloses a removable tank assembly that is sized to fit the bed of a dump truck.

Despite such inventions, there exists a continuing need for new and improved apparatuses for transporting liquids using land-driven vehicles.

SUMMARY

According to one aspect, the present invention provides new and improved tanks for containing water or other fluids, which tanks are mountable to a vehicle and are quickly and easily removed therefrom to permit the vehicle to be used for other purposes.

According to one representative embodiment, a fluid-transporting device for a land-driven vehicle includes at least one container, or tank, for holding a fluid. The container has a mounting member configured to mount the container to the vehicle and to allow the container to be completely removed from the vehicle. The fluid-transporting device is configured to be carried by the vehicle such that at least a portion of the container is supported in front of the forward end of the vehicle. Although the capacity of the container can vary, the container desirably has a fluid capacity of at least about 400 gallons. In certain embodiments, the vehicle is a loader, (e.g., a skid-steer loader), which is particularly suitable for use in traveling over unpaved and rough surfaces, although other types of vehicles can also be used.

In particular embodiments, the container is generally U-shaped and includes a forward-container portion and first and second side-container portions positioned rearward of the forward-container portion. Thus, when the container is mounted on the vehicle, the forward-container portion is supported in front of the forward end of the vehicle and the side-container portions are supported adjacent respective sides of the vehicle.

In one illustrated embodiment, the first and second side-container portions are integral with the forward-container portion. In another illustrated embodiment, the first and second side-container portions and the forward-container portion each comprise a separate container. In the latter embodiment, the side-container portions can be fluidly connected to the forward-container portion by respective fluid conduits.

The fluid-transporting device can further include a pump and a discharge conduit fluidly connectable to the pump for discharging fluid through one or more fluid outlets. Various spray nozzles or other types of fluid-distributing equipment can be connected to one or more of the fluid outlets to distribute the fluid in a desired manner. In one implementation, a fire hose connected to one of the fluid outlets is used to extinguish or control the spread of a fire with water contained in the container. In another implementation, water is sprayed from an electric water monitor, such as used in fire control, connected to one of the fluid outlets.

According to another representative embodiment, an apparatus for transporting liquid on a land-driven vehicle includes a tank that is mountable to the vehicle. The tank is generally U-shaped and has a first container portion and second and third container portions that are generally orthogonal to the length of the first container portion.

According to yet another representative embodiment, an apparatus for transporting a fluid includes a land-driven vehicle having a driver compartment and a forward end. The apparatus also includes at least one fluid container for holding a fluid. The fluid container is configured to be carried by the vehicle with at least a portion of the fluid container being supported in front of the forward end of the vehicle.

In another representative embodiment, a method is provided for transporting a liquid with a loader. The method includes introducing the liquid into a container that is releasably mountable to a loader. The method further includes mounting the container on a loader, and discharging, under pressure, the liquid from the container.

According to another representative embodiment, a method is provided for transporting a liquid with a land-driven vehicle having a driver compartment and a forward end. The method includes introducing the liquid into a container, and carrying the container on the vehicle such that a portion of the container is supported in front of the forward end of the vehicle.

The foregoing and other features and advantages of the invention will become more apparent from the following detailed description of several embodiments, which proceeds with reference to the accompanying figures.

DETAILED DESCRIPTION

As used herein, the singular forms "a," "an," and "the" refer to one or more than one, unless the context clearly dictates otherwise.

As used herein, the term "includes" means "comprises."

As used herein, a group of individual members stated in the alternative includes embodiments relating to a single member of the group or combinations of multiple members. For example, the term "a, b, or c," includes embodiments relating to "a," "b," "c," "a and b," "a and c," "b and c," and "a, b, and c."

Figure 1:
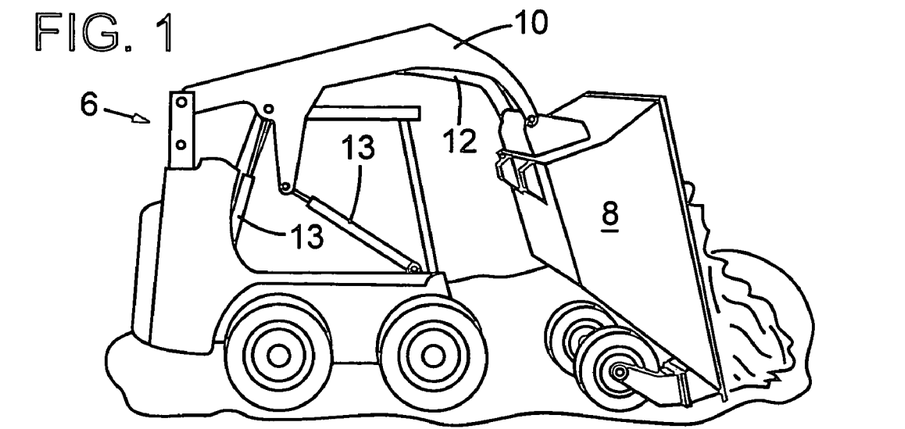
FIG. 1 is a perspective view illustrating a conventional use for a loader.

FIG. 1 shows a loader 6 and a dumping hopper 8 connected to the loader 6 being used in a conventional manner to transfer earth at a construction site. According to one aspect of my invention, an apparatus is provided for transporting liquids or other fluids with a land-driven vehicle, such as the loader 6 shown in FIG. 1. For ease of description, the embodiments disclosed herein are described with reference to a loader. However, the embodiments disclosed herein can also be adapted for use with other types of land-driven vehicles.

Loaders, such as loader 6 of FIG. 1, can have various constructions, but usually are equipped with first and second movable support arms 10 and 12 (FIG. 1), respectively, for supporting and/or manipulating various attachments or tools, such as the dumping hopper 8. Movement of support arms 10, 12 typically is controlled by hydraulic cylinders 13. Without limitation, some examples of such loaders include all-wheel steer loaders, skid-steer loaders, backhoe loaders, and track loaders.

Figure 2:
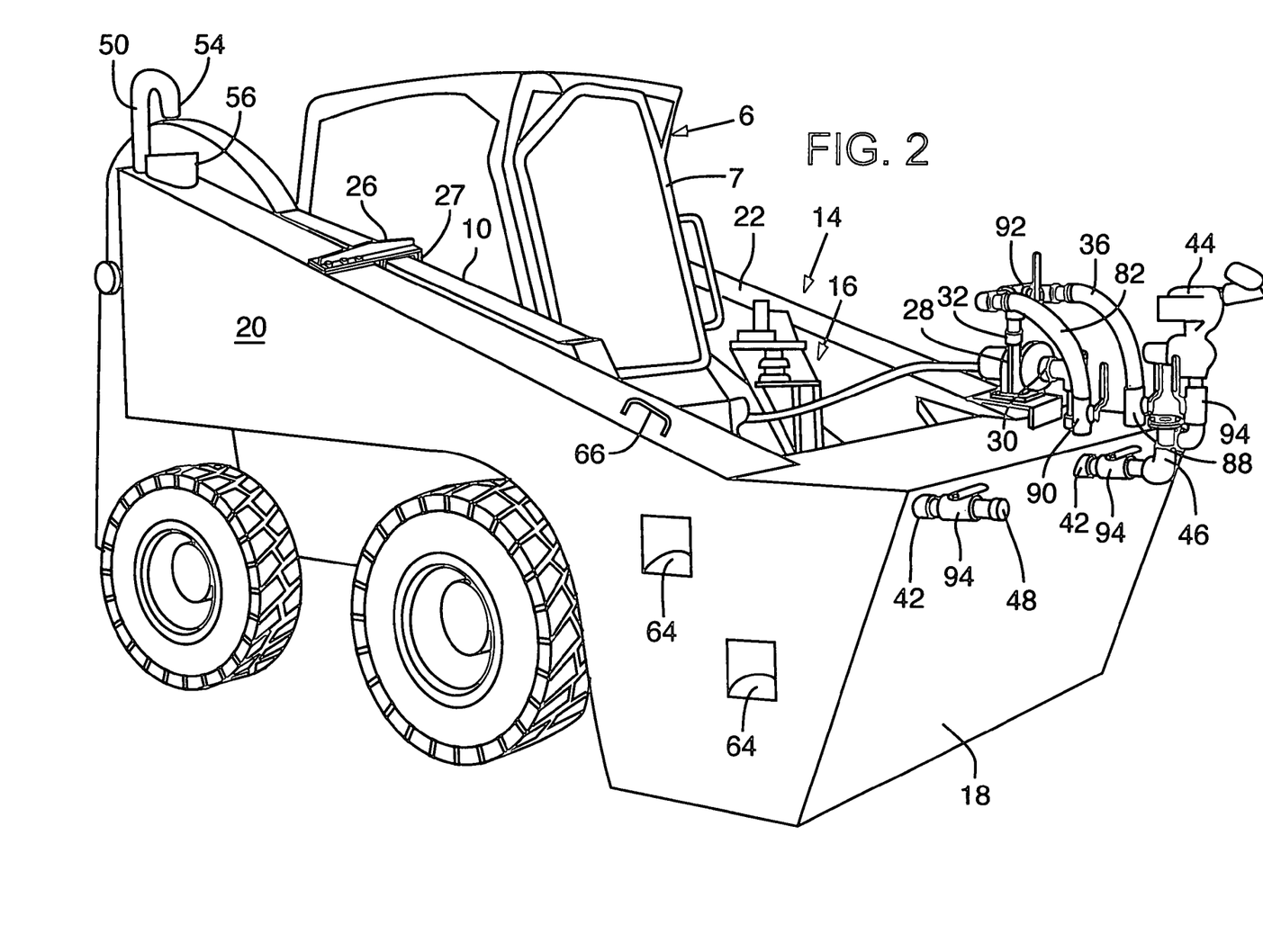
FIG. 2 is a perspective view of one embodiment of a fluid-transporting device, which is shown mounted on a loader.
Figure 3:
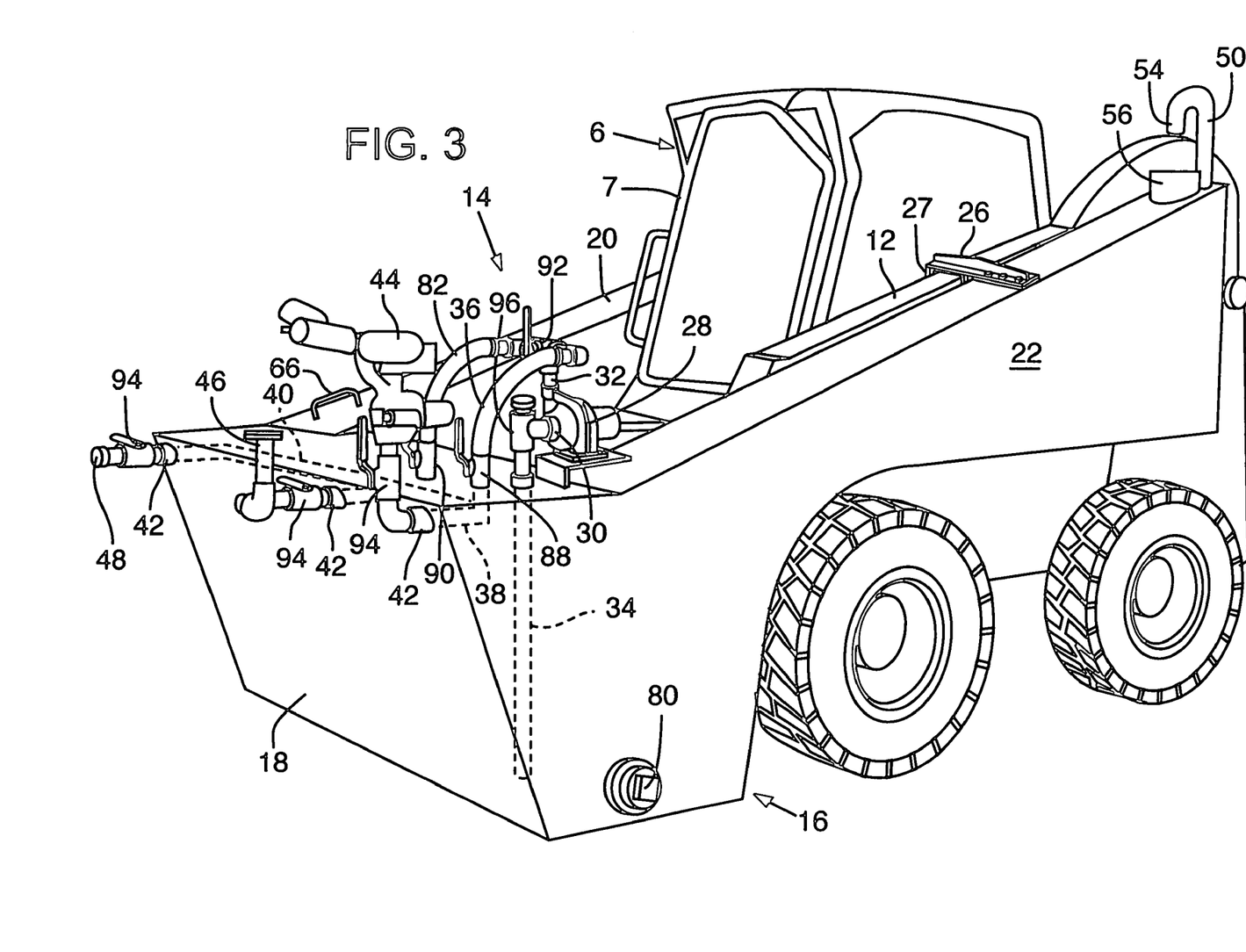
FIG. 3 is another perspective view of the fluid-transporting device and loader of FIG. 2, as viewed from the opposite side.

Referring to FIGS. 2 and 3, there is shown a fluid-transporting device 14 according to one embodiment of my invention, mounted on the loader 6. FIGS. 4-8 show the fluid-transporting device 14 removed from the loader 6. The fluid-transporting device 14 in the illustrated embodiment comprises a generally U-shaped fluid container, or tank, 16 (as best shown in FIG. 6). The illustrated container 16 generally comprises a forward-container portion 18 and first and second side-container portions 20 and 22, respectively, positioned aft of the forward-container portion 18. As best shown in FIG. 6, the side-container portions 20, 22 are generally orthogonal to the length of the forward-container portion 18.

The fluid container 16 desirably is configured to be mountable to and completely removable from the loader 6 to permit the loader to be alternatively used for transporting fluids in the container 16 and for performing various other tasks with conventional attachments. Although the capacity of the container 16 can vary, the container 16 in one embodiment has a capacity of about 470 gallons. In other embodiments, the container 16 can have a smaller or greater capacity.

As shown in FIGS. 2 and 3, when the fluid container 16 is mounted on the loader 6, the forward-container portion 18 is supported in front of the forward end of the loader 6 and the side-container portions 20, 22 are supported adjacent respective sides of the loader 6. The illustrated fluid container 16 desirably is configured to be carried by the loader 6; that is, the weight of the fluid container 16 (and any fluid contained therein) is born by the loader 6, without the use of wheels or tracks mounted on the container 16 to support its weight on the ground. However, in alternative embodiments, the container 16 is drawn, pushed, or otherwise transported by the loader, but wheels or tracks are mounted to the container 16 to support the container as it travels across the ground.

Figure 8A:
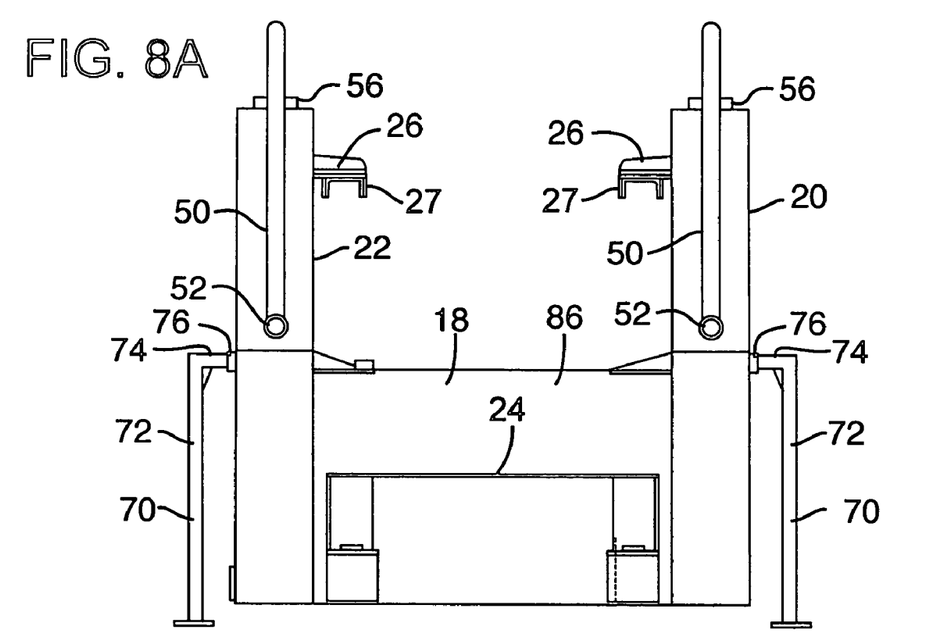
FIG. 8A is a back elevation view of the fluid-transporting device of FIG. 4.
Figure 8B:
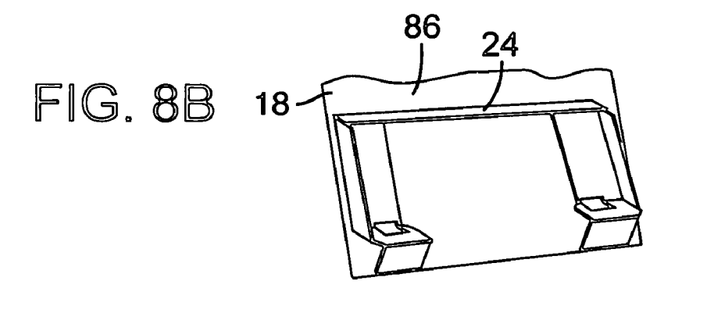
FIG. 8B is a rear perspective view of the rear wall of the forward-container portion of the device of FIG. 4.

As shown in FIGS. 8A and 8B, the container 16 can include a mounting member 24 secured to the rear wall 86 of the forward-container portion 18. Mounted on the forward ends of support arms 10, 12 is a mating attachment mechanism (not shown) that is configured to securely mate with the mounting member 24 for supporting the container on the support arms 10, 12. In particular embodiments, the mounting member 24 and the corresponding attachment mechanism on the support arms 10, 12 can comprise a Bob-Tach™ mounting system, available from Bobcat Company of West Fargo, N. Dak. Mechanisms other than the illustrated mounting member also can be used to mount the container to the loader. For example, bolts, cables, clamps, and various other types of hardware can be used to securely mount the container to the loader.

Figure 4:
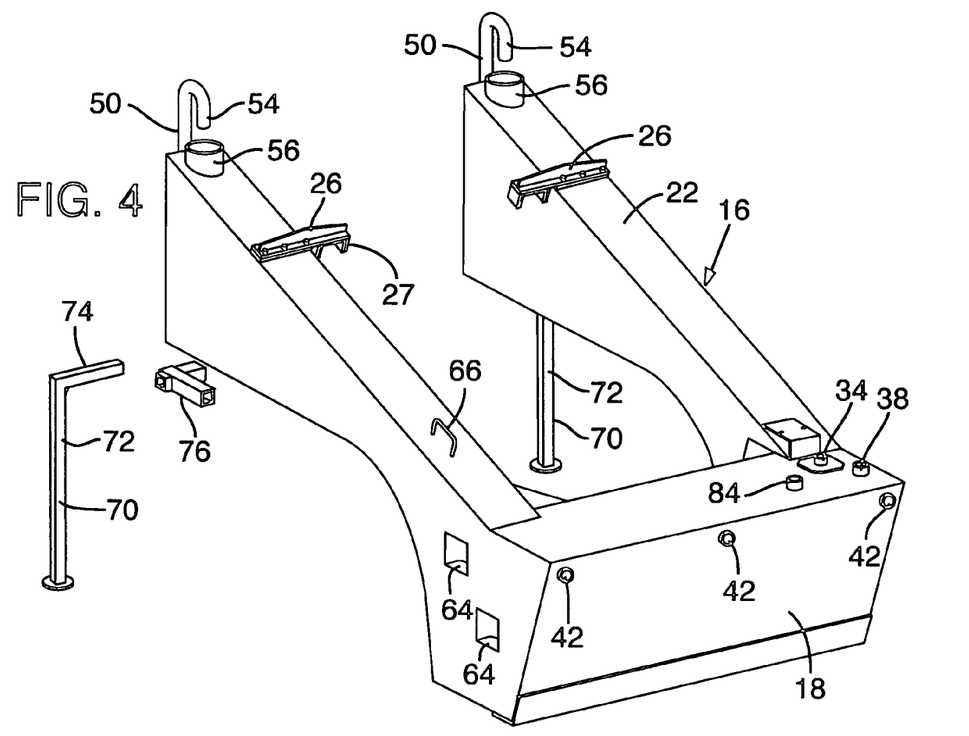
FIG. 4 is a perspective view of the fluid-transporting device of FIG. 2, shown removed from the loader and without the pump and spray nozzles.
Figure 5:
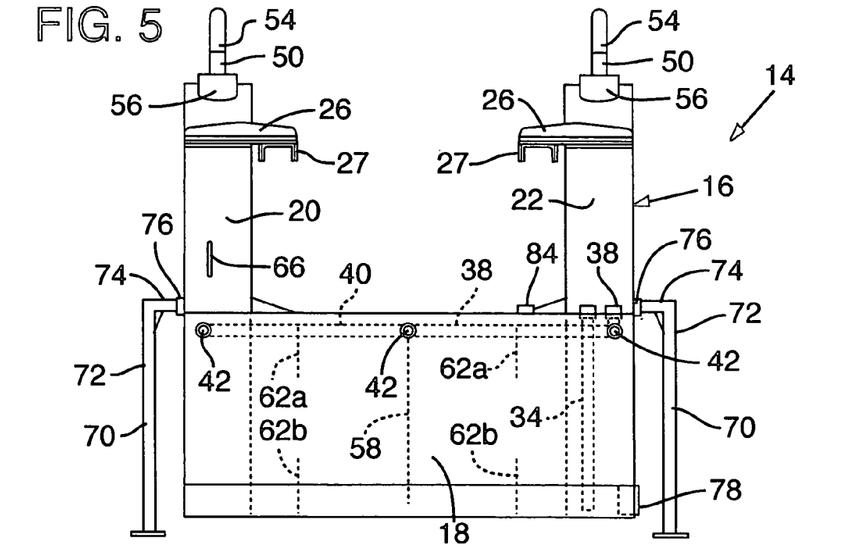
FIG. 5 is a front elevation view of the fluid-transporting device shown in FIG. 4.
Figure 6:
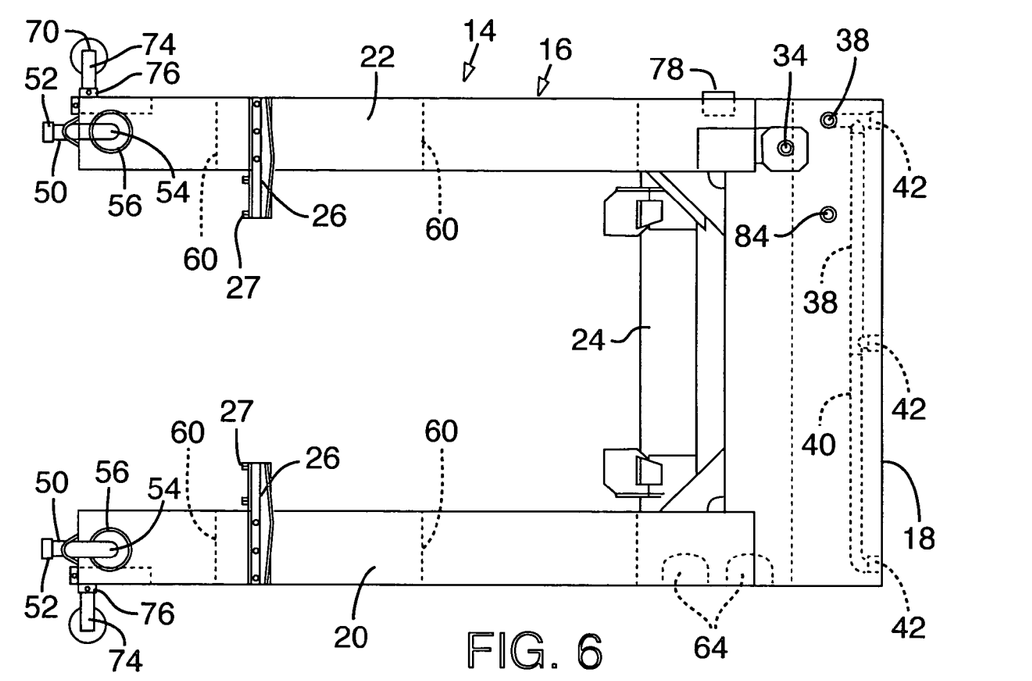
FIG. 6 is a top plan view of the fluid-transporting device of FIG. 4.

As shown in FIGS. 2-8A, braces 26 can be secured to the side-container portions 20, 22 to assist in supporting the side-container portions on the support arms 10, 12 (FIGS. 2 and 3). As best shown in FIGS. 5 and 8A, each brace 26 has a generally U-shaped bracket 27 configured to fit over a respective support arm 10, 12. Brackets 27 minimize lateral (i.e., side-to side) movement of the side-container portions 20, 22 relative to the support arms 10, 12.

As shown in FIGS. 2 and 3, a pump 28 may be provided for discharging liquid contained in the container 16. The pump 28 can be mounted to, or otherwise carried by, the container 16. Alternatively, the pump 28 can be mounted on the loader 6. Although not required, the pump 28 desirably is a power take-off type pump. For example, the pump 28 in a working embodiment comprises a hydraulically-driven pump adapted for connection to an existing hydraulic system of the loader 6. Alternatively, the pump 28 can be operatively coupled to a drive shaft of the loader 6. In other embodiments, other forms of drive mechanisms can be use to power the pump 28, such as a dedicated motor or engine.

In addition, in alternative embodiments, the pump 28 may comprise a submersible pump disposed inside the container 16. In this alternative embodiment, an inlet conduit to the pump 38 (described below) would be optional.

As best shown in FIG. 3, the pump 28 has an inlet 30 and an outlet 32. The inlet 30 of the pump 28 is fluidly connected to an inlet conduit in the form of an inlet pipe 34 that extends downwardly into the forward-container portion 18. Although not required, in the illustrated embodiment, the inlet 30 of pump 28 is connected to the outlet of a three-way valve 96, and the inlet pipe 34 is connected to one of the inlets of the three-way valve 96. The other inlet of the three-way valve 96 can be connected to a suction hose when filling the container 16, as further described below. The inlet pipe 34 can comprise flexible or rigid piping. The lower, or inlet, end of the inlet pipe 34 extends to a position just above the bottom surface of the forward-container portion 18. Although not shown in the figures, a check valve or a back-flow preventer may be coupled to the inlet end of the inlet pipe 34.

Fluid (e.g., water) in the container 16 can be pumped by the pump 28 through an outlet conduit, which in the illustrated configuration comprises a flexible hose or tube 36 coupled to a discharge manifold 38. As best shown in FIG. 3, the flexible hose 36 is coupled at one end to the outlet 32 of the pump 28 and at its opposite end to the discharge manifold 38. A shut-off valve 88 (e.g., a ball valve) can be used to couple hose 36 to the discharge manifold 38. The discharge manifold 38 desirably is mounted inside of the container 16 to avoid damage to the discharge manifold, although in other embodiments, the discharge manifold can be mounted to the exterior of the container 16. The discharge manifold 38 in the illustrated embodiment comprises a pipe 40 (as best shown in FIGS. 5 and 6) that extends longitudinally between the sides of the forward-container portion 18. Plural outlet conduits 42 extend from pipe 40 through the front wall of the forward-container portion 18.

The outlet 32 of the pump 28 may be fluidly connected to another flexible hose 82 (or other type of fluid conduit) that is fluidly connected at its discharge end to an inlet port 84 (FIG. 4). A shut-off valve 90 (FIG. 3) can be used to couple hose 82 to inlet port 84. Hose 82 serves as a re-circulation line by re-circulating fluid back into the container 16 when the fluid is not being discharged through outlets 42. A shut-off valve 92 can be positioned between the inlets of hoses 36 and 82 to selectively divert fluid through the discharge manifold 38 or back into the container 16.

In the illustrated embodiment, the forward-container portion 18 is in fluid communication with the side-container portions 20, 22 so that fluid contained in each side-container portion 20, 22 can flow into the forward-container portion 18 and be discharged through the pump 28. In other embodiments, however, the forward-container 18 and the side-container portions 20, 22 can be fluidly disconnected from each other so that fluid cannot flow therebetween. In the latter embodiment, each portion of the container 16 can be provided with a respective pump to discharge fluid therefrom.

Various attachments can be coupled to outlet conduits 42 for distributing the fluid contained in the container 16. As shown in FIGS. 2 and 3, for example, one of the outlets 42 is fluidly connected to an electrically-controlled water monitor 44 that is operable to produce different spray patterns of liquid discharged by the pump. The water monitor 44 can be manually or electrically controlled by a user to select a desired spray pattern. One example of a water monitor that can be used is a model 8294-04 Scorpion® monitor available from Elkhart Brass Mfg. of Elkhart, Ind. A "duck bill" nozzle 46 can be coupled to another outlet conduit 42 for producing a semi-circular spray pattern. Various other types of nozzles or spray equipment can be used in lieu of, or in addition to, the water monitor 44 and duck bill nozzle 46. An end cap 48 can be placed on any outlet conduit 42 that are not being used. The fluid outlets 42 can include valves 94 to control the flow of liquid to their respective attachments.

In one implementation, the container 16 can be filled with water from a fire hydrant or other public water supply. To prevent the backflow of contaminants from the container 16 into the public water supply, one or more inlet-fill pipes 50 can be mounted to the outside of the container 16. In the illustrated embodiment, for example, an inlet-fill pipe 50 is mounted to the aft end of each side-container portion 20, 22. Each inlet-fill pipe 50 has an inlet 52 (FIGS. 6 and 7) and an outlet 54 (FIGS. 2-7) positioned to direct liquid downwardly through a respective fill port 56 of a respective side-container portion 20, 22. The inlet 52 of each inlet-fill pipe 50 can be configured to be connectable to a liquid-supply line (not shown) (e.g., a water hose) for supplying liquid to the container 16. Since each outlet 54 is spaced from its respective fill port 56, backflow of contaminants from the container 16 to the liquid-supply line can be avoided. In other embodiments, a liquid-supply hose can be connected directly to an inlet port of the container 16 to introduce liquid therein.

Device 14 in the illustrated embodiment is also "self-loading"; that is, the pump 28 can be used to draw fluid into the container 16 from a non-pressurized source of fluid, such as a lake or river when filling the container 16 with water. To fill the container 16 using pump 28, a suction hose (or other fluid conduit) is connected to the available inlet of the three-way valve 96, the valve 96 is activated so that the suction hose is fluidly connected to the inlet 30 of the pump and the inlet pipe 34 is fluidly disconnected from the inlet 30, and valve 92 is activated so that hose 82 is fluidly connected to the outlet 32 of pump 28. The free end of the suction hose is placed in a source of fluid (e.g., a lake), and the pump is activated to cause fluid to be drawn through the suction hose and discharged through hose 82 and into the container 16.

Figure 7:
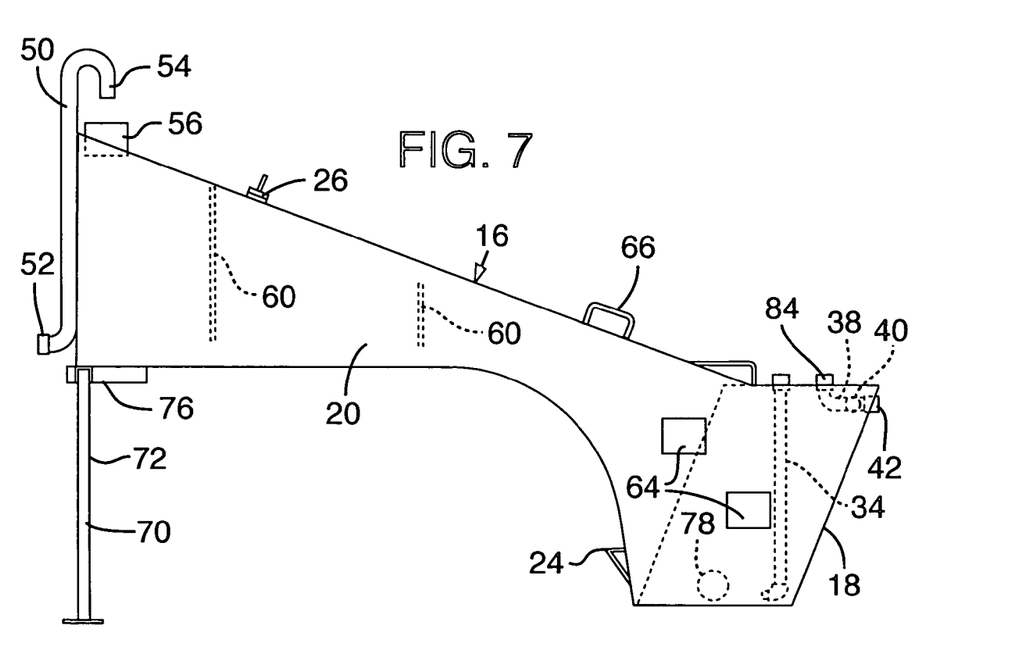
FIG. 7 is a side elevation view of the fluid-transporting device of FIG. 4.

As shown in FIGS. 5-7, a drain port 78 can be provided in the forward-container portion 18 to drain liquid from the container 16. A removable plug, or cap, 80 (FIG. 3) can be used to seal the drain port 78 and retain liquid in the container.

As shown in FIG. 5, one or more internal gussets 62a and 62b can be welded inside the forward-container portion 18 to provide structural reinforcement to the walls of the forward-container portion. Gussets 62a are welded to the rear wall and top wall of the forward-container portion 18. Gussets 62b are welded to the bottom wall and front wall of the forward-container portion 18. The forward-container portion can also include one or more internal baffles 58 to minimize sloshing of the liquid contained in the container 16 when the loader 6 is moving. Similarly, side-container portions 20, 22 can also include one or more internal baffles 60 (FIGS. 6 and 7). Baffles 58, 60 also serve as braces for providing additional structural reinforcement to the container 16.

As shown in FIGS. 2, 4, and 7, one or more foot-holds 64 can be formed in the side of the container 16 to permit a driver to ascend the container 16 to gain access into the driver compartment 7 (FIG. 2) of the loader 6. A handle 66 can be conveniently positioned on side-container portion 20 to assist the driver in ascending the container 16. In alternative embodiments, stairs or steps can be secured to the outside of the container 16.

As shown in FIGS. 4, 5, and 7, removable legs, or supports, 70 can be used to support the container 16 in an upright position when it is removed from the loader 6. Each leg 70 in the illustrated configuration comprises a vertical support 72 and a horizontal support 74. The horizontal support 74 of each leg 70 is inserted into a respective bracket 76 secured to the aft end of one of the side-container portions 20, 22. A bolt (not shown) or similar fastener can be used to releasably retain each horizontal support 74 to its respective bracket 76. While the illustrated embodiment includes legs that are removable, in alternative embodiments the legs can be permanently connected to the container 16. In one embodiment, for example, a leg can be coupled to the aft end of each side-container portion 20, 22 with a respective hinge. In this alternative embodiment, when the container is mounted on the loader, the legs can be folded or pivoted upwardly against the side-container portions 20, 22. When the container is removed from the loader, the legs can be pivoted downwardly to support the container in an upright position.

The fluid-transporting device 14 can include other features not shown in the drawings. For example, one or more mirrors can be mounted at convenient positions on the device to increase the field of view of a driver. In one embodiment, a mirror is mounted at each end of the forward-container portion 18 and positioned to enable a driver to see the area on each side of the loader 6. In addition, a non-skid surface material (e.g., non-skid paint) can be added to the foot-holds 64 and/or the top surfaces of the container 16 to minimize slipping when accessing or leaving the driver compartment 7.

Figure 9:
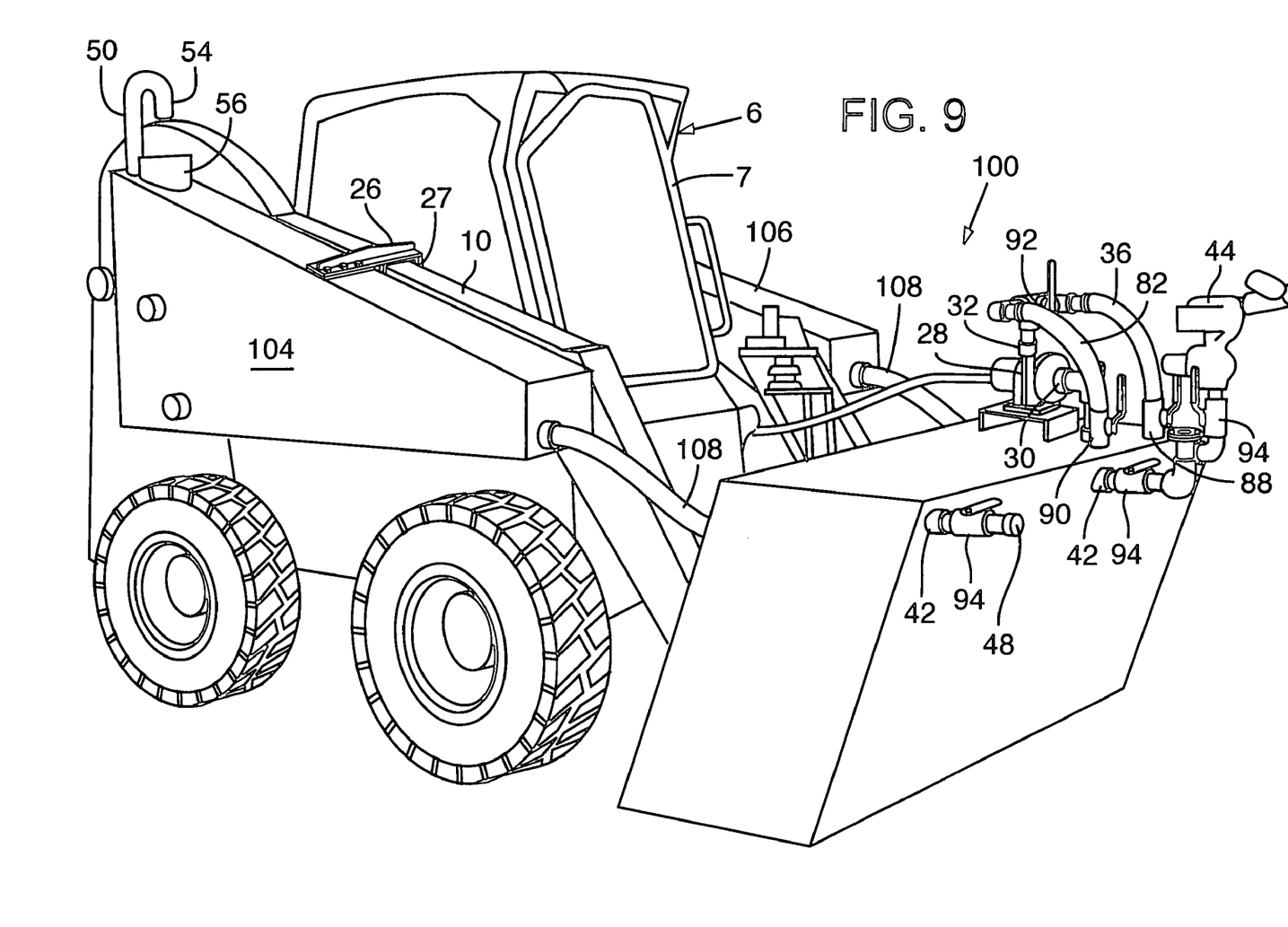
FIG. 9 is another embodiment of a fluid-transporting device shown mounted on a loader.

Referring to FIG. 9, there is shown a fluid-transporting device 100 according to another embodiment of my invention, mounted on a loader 6. The fluid-transporting device 100 comprises a forward container, or tank, 102 and separate side containers 104 and 106 that are fluidly connectable to the forward tank 102 via respective fluid conduits 108 (e.g., flexible hoses). The forward container 102 can have a mounting member 24 (not shown in FIG. 9) for mounting to an attachment mechanism on the support arms 10, 12 of the loader 6, such as the embodiment shown in FIGS. 8A and 8B. Each side container 104, 106 in the illustrated configuration has a bracket 26 for mounting the side containers to respective support arms 10, 12 of the loader 6.

As shown in FIG. 9, a pump 28 can be mounted to the forward container 102 for discharging liquid contained in the forward container 102 and side containers 104, 106. In other embodiments, a separate pump can mounted on each container 102, 104, and 106 for selectively discharging liquid from each container. In addition, valves or other flow-control devices can be used to control the flow of liquid from each side container 104, 106 to the forward container 102. For example, a manual or electric shut-off valve can be positioned in-line with each fluid conduit 108.

The embodiments described herein can be used for transporting and/or distributing a fluid in various applications. An exemplary use of the embodiments described herein is fire control. In particular, the disclosed apparatuses are especially suited for transporting water to fires in remote locations not served by fire hydrants and for transporting water to locations requiring travel over rough terrain. Other uses include spraying water on a road surface to clear debris therefrom, spraying water on a dirt surface at a construction site to minimize dust creation, and hauling water to a remote site where water is not readily available.

The present invention has been shown in the described embodiments for illustrative purposes only. The present invention may be subject to many modifications and changes without departing from the spirit or essential characteristics thereof. I therefore claim as my invention all such modifications as come within the spirit and scope of the following claims.

I claim:

1. A method for transporting a liquid with a loader having first and second movable support arms, the method comprising:

mounting a container on the support arms of the loader such that the container is supported above the ground; and introducing the liquid into the container;

wherein the container comprises a forward container portion having a rear wall, the container also comprising first and second side container portions extending rearwardly from the rear wall of the forward container portion; and mounting the container to the support arms comprises mounting the forward container portion to forward ends of the support arms such that at least a portion of the container is supported in front of the forward end of the loader;

wherein mounting the container to the support arms further comprises mounting at least portions of the side container portions at elevated positions with respect to the forward container portion such that liquid in the side container portions can flow under gravity into the forward container portion.

2. The method of claim 1, wherein:

each side container portion extends adjacent and alongside one of the support arms; and mounting the container to the support arms further comprises securing each side container portion to an adjacent support arm.

3. The method of claim 1, wherein the loader comprises a driver area and the first and second side container portions extend rearwardly from the forward container portion and past the driver area.

4. The method of claim 1, wherein mounting the forward container portion to forward ends of the support arms comprises coupling the forward ends of the support arms to a mounting member on the rear wall of the forward container portion.

5. The method of claim 1, wherein the container has a generally U-shaped configuration.

* * * * *

UNITED STATES PATENT AND TRADEMARK OFFICE
CERTIFICATE OF CORRECTION

PATENT NO. : 7,520,411 B2  
APPLICATION NO. : 11/077626  
DATED : April 21, 2009  
INVENTOR(S) : Stephen P. Bieker It is certified that error appears in the above-identified patent and that said Letters Patent is hereby corrected as shown below:

In the Specifications:

In the Cross-Reference to Related Applications:

Column 1, line 7, "The present application is a continuation of U.S. Provisional Application 10/631,447, filed Jul. 30, 2003, U.S. Pat. No. 6,889,877 which claims the benefit of U.S. Provisional Application No. 60/399,941 filed February 18, 2003, and U.S. Provisional Application No. 60/399,941 filed Jul. 30, 2002."

should be --The present application is a continuation of U.S. Patent Application No. 10/631,447, filed Jul. 30, 2003, now U.S. Pat. No. 6,889,877 which claims the benefit of U.S. Provisional Application No. 60/448,330 filed February 18, 2003, and U.S. Provisional Application No. 60/399,941 filed Jul. 30, 2002.--

Signed and Sealed this  
Sixteenth Day of July, 2013

Teresa Stanek Rea  
*Acting Director of the United States Patent and Trademark Office*